(12) United States Patent
Paoli et al.

(10) Patent No.: US 6,968,049 B2
(45) Date of Patent: Nov. 22, 2005

(54) TRANSMISSION OF CHARGING SIGNALS ON A DATA TRANSMISSION PATH

(75) Inventors: Gerhard Paoli, Villach (AT); Dietmar Sträussnigg, Villach (AT)

(73) Assignee: Infineon Technologies AG, Munich (DE)

(*) Notice: Subject to any disclaimer, the term of this patent is extended or adjusted under 35 U.S.C. 154(b) by 418 days.

(21) Appl. No.: 10/252,738

(22) Filed: Sep. 23, 2002

(65) Prior Publication Data
US 2003/0086502 A1 May 8, 2003

(30) Foreign Application Priority Data
Sep. 24, 2001 (DE) ................................ 101 46 891

(51) Int. Cl.[7] ...................... H04M 15/00; H04M 3/00; H04M 1/00
(52) U.S. Cl. ...................... 379/124; 379/350; 379/394; 379/395
(58) Field of Search .......................... 379/114.01, 124, 379/127.03, 137, 139, 141, 350, 353, 387.02, 379/390.01, 395, 395.01, 394, 398

(56) References Cited

U.S. PATENT DOCUMENTS

| 4,211,896 A | 7/1980 | Ferrieu ................ 179/18 FA |
| 4,638,122 A * | 1/1987 | Siligoni et al. ............ 379/124 |
| 4,991,105 A * | 2/1991 | Pimental ..................... 702/58 |
| 5,172,407 A * | 12/1992 | Alenius ..................... 379/124 |
| 5,452,345 A * | 9/1995 | Zhou et al. ................. 379/124 |
| 5,862,213 A * | 1/1999 | Klamt et al. ................ 379/413 |
| 6,628,762 B1 * | 9/2003 | Ahrndt et al. ........... 379/90.01 |
| 6,728,367 B1 * | 4/2004 | Swam ....................... 379/372 |
| 2002/0177430 A1 | 11/2002 | Dorrer et al. |
| 2003/0068050 A1 * | 4/2003 | Paoli et al. ................. 379/377 |

FOREIGN PATENT DOCUMENTS

| DE | 3303133 | 3/1992 | .......... H03B 19/00 |
| DE | 4216577 | 5/1993 | .......... H04M 15/00 |
| GB | 2149618 | 6/1985 | .......... H04M 19/00 |
| WO | WO 01/35626 A2 | 5/2001 | |
| WO | WO 01/67735 A1 | 9/2001 | |

* cited by examiner

Primary Examiner—Quoc Tran
(74) Attorney, Agent, or Firm—Fish & Richardson P.C.

(57) ABSTRACT

An apparatus for transmitting charging signals on a data transmission path having a line impedance includes a driver device for setting a line voltage level that corresponds to the line impedance. The driver device is configured to provide, in response to a driver input voltage level, a driver output current and a driver output voltage level. A current detection unit provides a current signal indicative of the driver output current and a current signal matching unit receives the current signal from the current detection unit and adjusts a level of the current signal for further processing by a filter device and by a regulation device. A matching filter unit then matches the driver device to a data transmission path unit.

16 Claims, 2 Drawing Sheets

US 6,968,049 B2

TRANSMISSION OF CHARGING SIGNALS ON A DATA TRANSMISSION PATH

RELATED APPLICATIONS

This application claims the benefit of the Sep. 24, 2001 priority date of German application 101 46 891.1.

1. Field of Invention

The present invention relates to a method for transmitting charging signals via a data transmission path, and particular to a method in which a line voltage level can be predetermined.

2. Background

Many different methods have been used for transmitting data via conventional telephone lines, for example via conventional double-cored copper wires. These methods are referred to as DSL (digital subscriber line) methods.

An asymmetric DSL method (ADSL=asymmetric digital subscriber line) is particularly widely used, in which matching filter units, also referred to as splitter filters, are used at the exchange end and subscriber end, in order to separate conventional telephony (POT=plain old telephony) and ADSL applications for data transmission.

In the asymmetric DSL method, data is transmitted asymmetrically, that is to say at different speeds depending on the direction. Data is typically transmitted at a data transmission rate of 8 Mbit/s from a switching center to a subscriber point, while data is transmitted from a subscriber end to an exchange end (upstream) at a maximum of 1 Mbit/s.

It should be mentioned that the data transmission rate of both downstream and upstream is dependent on the line length. One major advantage of using ADSL methods is that existing cable networks, for example double-cored copper lines, conventional telephone lines, etc., can still be used for data transmission.

In order to charge or bill for telephone calls when using data transmission lines, so-called charging signals are transmitted at specific frequencies, typically at frequencies of 16 kHz or 12 kHz from the switching center to the subscriber point.

In this case, voltage levels within permissible tolerances are specified for the charging signals, and these may vary between different countries. In the process, it should be noted that the required voltage levels for the charging signals (also referred to as teletax signals) must be designed to be independent of the respective line impedance of one or more data transmission path units.

An estimate of a driver input voltage level at the input of a driver circuit is made in a conventional manner, and is compared with a desired nominal value of a driver input voltage level. An amplitude and a voltage level for the charging signal are varied in a control unit of a regulation device until the nominal value is reached, or until the control error is 0.

For conventional POTs applications, it is sufficient to regulate the driver input voltage level at the input of the driver device, since any voltage drop across a downstream series resistance element or downstream circuitry, in particular downstream protection circuitry, is negligible.

One disadvantageous feature is that conventional methods for voltage level production for charging signals cannot be used for ADSL methods that are operated via POTs applications since voltage levels that do not conform with the standards occur on the line and at the at least one data transmission path unit. This is a result of the fact that it is no longer possible to ignore any influence of external circuitry resulting, for example, from a matching filter unit (also referred to as a splitter filter unit), a transformer for ADSL data transmission, impedance synthesis of the subscriber line interface circuit (SLIC).

A further disadvantage is that the overall circuitry is highly sensitive to load changes on the line due to the interaction of the matching filter unit with the ADSL data transmission path and/or with the at least one data transmission path unit.

It is thus disadvantageously not sufficient just to keep a driver input voltage level at the input of a driver device constant.

SUMMARY

One object of the present invention is thus to regulate a voltage level directly on the transmission line, that is to say a line voltage level, with a defined driver output voltage level being produced by a driver device.

One major idea of the invention is to determine a line voltage level on the basis of a detected output current from the driver device as well as known series resistance elements, series reactive elements, parallel resistance elements and parallel reactive elements of the at least one matching filter unit, and on the basis of known data transmission path capacitances, data transmission path inductances and data transmission path resistances of the at least one data transmission path unit.

Furthermore, it is necessary to eliminate any influence of a complex (frequency-dependent) gain factor of an amplifier unit which is provided in the driver device. In addition, any influence of filter parallel currents and line parallel currents must be compensated for by the matching filter unit and/or the data transmission path unit, so as to ensure insensitivity to load changes on the transmission line.

The method according to the invention for transmitting charging signals via a data transmission path essentially has the following steps:

a) determination of an output current, which is produced by the driver device, by means of a current detection unit;

b) determination of a transfer function of the data transmission path for at least one frequency, at which the charging signals are to be transmitted from a switching center to a subscriber point, with any influence of the frequency-dependent gain factor of an amplifier unit in the driver device having to be eliminated;

c) entry of a nominal value in a nominal value comparison unit of a regulation device in order to provide a control signal;

d) modification of the output current such that the entered nominal value matches the output signal of a determination unit, which output signal corresponds to the line voltage level at that time; and e) emission of a driver output voltage level by the driver device, which voltage level predetermines the line voltage level.

The dependent claims contain advantageous developments and improvements of the respective subject matter of the invention.

According to one preferred development of the present invention, the charging signals are produced as sinusoidal signals, which can be transmitted via the data transmission path unit.

According to yet another preferred development of the present invention, the charging signals are transmitted at frequencies, which can be predetermined, from the switching center to the subscriber point. The frequencies of 16 kHz and 12 kHz are advantageously used via conventional telephone lines.

According to yet another preferred development of the present invention, the required driver output voltage level is produced independently of the line impedance of the data transmission path.

An overall voltage drop across the matching filter unit and the at least one data transmission path unit is advantageously determined, so that a corresponding driver output voltage level can be predetermined.

According to yet another preferred development of the present invention, a feedback resistance element and a feedback reactive element in a feedback branch of an amplifier unit in the driver device define a frequency-dependent gain factor, such that a constant line voltage level, which can be predetermined, is maintained for at least one frequency, at which the charging signals are to be transmitted.

According to yet another preferred development of the present invention, the overall voltage drop, which can be predetermined, is produced in order to set the line voltage level as a function of the driver output voltage level.

According to yet another preferred development of the present invention, a filter parallel current, which can be predetermined, is produced, and can be set as a function of series resistance elements, series reactive elements, parallel resistance elements and parallel reactive elements in the matching filter unit.

According to yet another preferred development of the present invention, a filter series current, which can be predetermined, is produced, which, together with the filter parallel current, represents the output current from a modified driver device.

The apparatus according to the invention for transmitting charging signals furthermore has:

a) a driver device for producing an output current and a driver output voltage level as a function of a driver input voltage level, in which a line voltage level can be set on a line impedance;

b) a current detection unit for determining the output current which is emitted from the driver device to the matching filter unit and to the at least one data transmission path unit;

c) a current signal matching unit for matching a current signal, which is emitted from the current detection unit, in order to produce a matched current signal, so that further processing can be carried out in an advantageous manner in a filter device and in a regulation device; and d) a matching filter unit for matching the driver device to at least one data transmission path unit.

Exemplary embodiments of the invention will be explained in more detail in the following description and are illustrated in the drawings, in which:

BRIEF DESCRIPTION OF THE DRAWINGS

In the figures, identical reference symbols denote identical or functionally identical components or steps.

DETAILED DESCRIPTION

Figure 1:
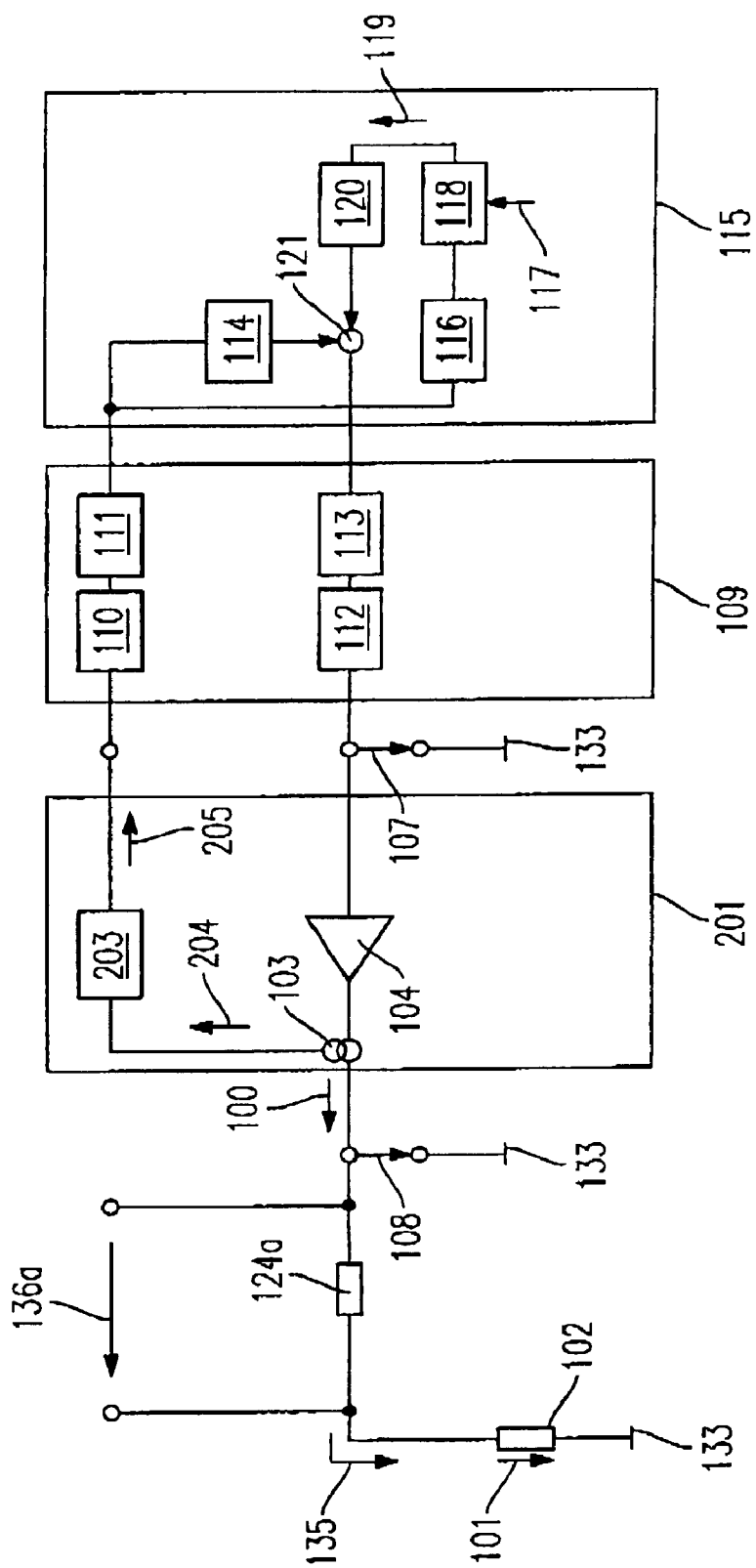
FIG. 1 shows a block diagram of a circuit arrangement for transmitting charging signals for conventional transmission of charging signals via conventional telephone lines.

In the block diagram, as shown in FIG. 1, of a circuit arrangement for transmitting charging signals, three major blocks are shown, that is to say a driver device 201, a filter device 109 and a regulation device 115. An output current 100 which is emitted from the driver device 201 is supplied to a data transmission path, in this case represented by a series resistance element 124a, with a driver output voltage level 108 with respect to a ground connection 133 being produced at the output of the driver device 201. The output current 100 causes an overall voltage drop 136a across the series resistance element 124a, so that a line voltage level 101 across a line impedance 102 which is connected in series with the series resistance element 124a is reduced in accordance with a voltage divider, that is to say the driver output voltage level 108 corresponds to the sum of the overall voltage drop 136a and of the line voltage level 101. The line series current 135 flowing through the line impedance 102 corresponds, in the block diagram shown in FIG. 1, to the output current 100 from the driver device 201.

The driver device 201 will be explained in more detail in the following text. The major component of the driver device 201 is an amplifier unit 104, which may, for example, be in the form of an operational amplifier. A current detection unit 103 is connected to the output of the amplifier unit 104 and supplies a current signal 204 which corresponds to the output current 100, so that the output current 100 is detected precisely.

The current detection unit 103 may, for example, be in the form of a Hall sensor. Furthermore, the current detection unit 103 may be produced by means of a shunt resistance element, with a tap at the connections of the shunt resistance element producing a voltage drop which is proportional to the output current and can be used as a current signal 204. The current signal 204 is supplied to a current signal matching unit 203, in which a level of the current signal can be adapted in order to obtain a matched current signal 205, which is supplied to the filter device 109.

Figure 2:
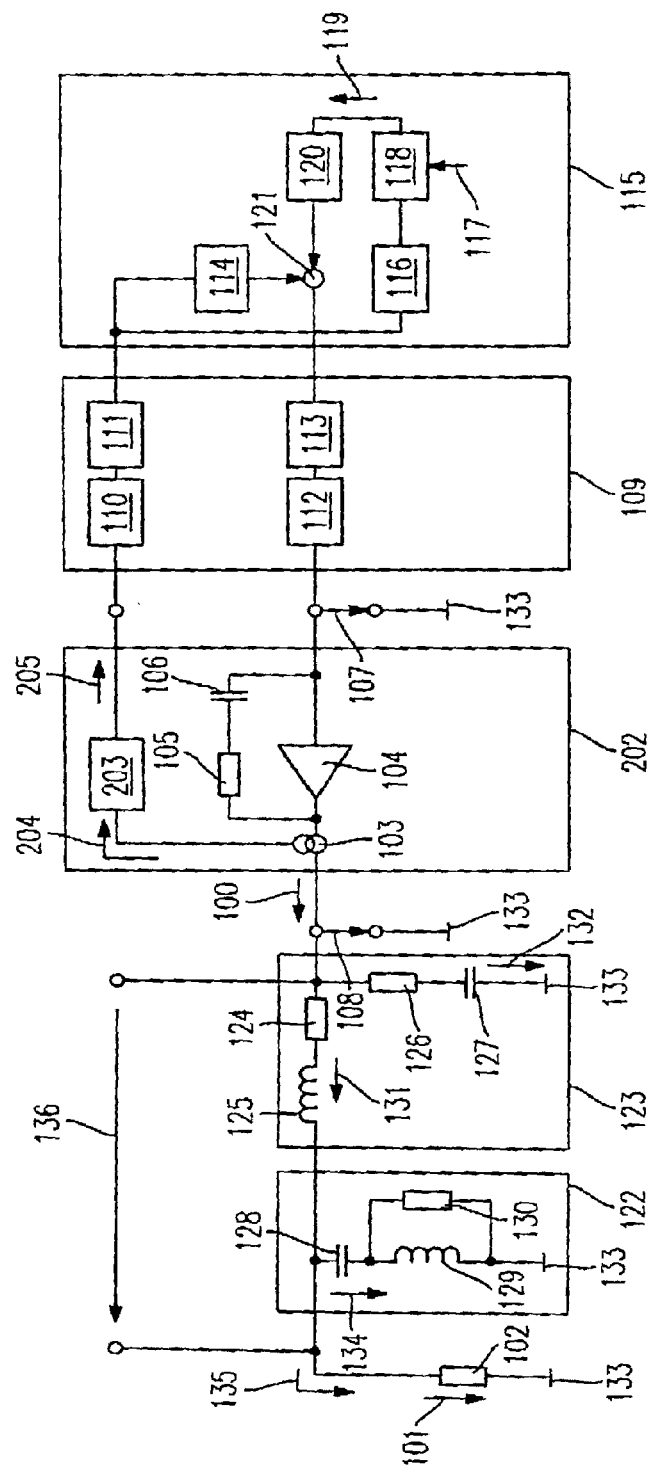
FIG. 2 shows a block diagram of a circuit arrangement for transmitting charging signals for ADSL methods, according to one exemplary embodiment of the present invention.

As is illustrated in the block diagram of the circuit arrangement for transmitting charging signals, the amplifier unit 104 may have a feedback branch comprising a feedback resistance element 105 and a feedback reactive element 106, thus resulting in a modified driver device 202. The units of the filter device 109 and of the regulation device 115, which are shown in FIG. 2, correspond to the units which are shown in FIG. 1.

It should be mentioned that the feedback resistance element 105 and the feedback reactive element 106 in the feedback branch of the amplifier unit 104 in the modified driver device 202 may be formed not only by passive elements (such as resistance elements R, inductive reactive elements L and capacitive reactive elements C), but also by active elements. According to the invention, the two elements which are arranged in the feedback branch, that is to say the feedback resistance element 105 and the feedback reactive element 106, are used to eliminate any influence of a complex, frequency-dependent gain factor of the amplifier unit 104, in order to eliminate any influence of parallel currents which can occur in a matching filter unit 123.

The data transmission path unit 122 and the matching filter unit 123 will be explained in more detail in the following text with reference to FIG. 2. In the illustrated exemplary embodiment of the present invention, the matching filter unit 123 comprises a series resistance, which is formed by a series resistance element 124 and a series reactive element 125, in the illustrated case a series reactive inductance, while, in contrast, a parallel resistance is formed from a parallel resistance element 126 and a parallel reactive element 127, in this case a parallel capacitance.

The series resistance is arranged between an input connection and an output connection of the matching filter unit, while the parallel resistance is arranged between the input connection and a ground connection 133. The currents which occur in the matching filter unit, that is to say a filter series current 131 and a filter parallel current 132, in total form the output current 100 of the modified driver device 201, while the magnitudes of the filter series current 131 and of the filter parallel current 132 depend on the circuit elements 124, 125, 126 and 127 which are used in the matching filter unit 123. The output connection of the matching filter unit 123 is connected to an input connection of the data transmission path unit 122.

A parallel current, referred to as a line parallel current 134, once again occurs in the data transmission path unit, so that the filter series current 131 flowing through the matching filter unit 123 is modified to a line series current 135 such that the filter series current 131 forms the total of the line parallel current 134 and the line series current 135.

The line parallel current 134 flows from the input connection of the data transmission path unit 122, via a data transmission path capacitance 128 and via a parallel circuit comprising a data transmission path inductance 129 and a data transmission path resistance 130, to the ground connection 133.

The line series current 135 flows through the line impedance 102, which has already been described with reference to FIG. 1, as a result of which a voltage drop occurs across the line impedance, that is to say a line voltage level 101 is produced, which can be tapped off between an output connection of the data transmission path unit 122 and the ground connection 133.

As illustrated in FIG. 2, the driver output voltage level 108 which is produced by the modified driver device 202 is reduced by an overall voltage drop 136, which is dropped across the series circuit comprising the data transmission path unit 122 and the matching filter unit 123.

A driver output voltage level 108, which is reduced by the overall voltage drop 136, is produced as the line voltage level 101, as a function of the circuit components of the data transmission path unit 122 and of the matching filter unit 123.

The blocks 109 and 115, which are arranged identically in FIGS. 1 and 2, will be described in more detail in the following text, that is to say the filter device 109 and the regulation device 115.

It should be mentioned that the devices 109 and 115, respectively, which are shown in FIGS. 1 and 2 have identical structures, but use different determination methods for defining the output current of the respectively corresponding driver devices 201 and 202. The regulation device 115 operates as a digital regulation device, while all the other circuit components, including the filter units 110, 112, operate in the analog domain. It can clearly be seen that analog/digital conversion is thus required, in an analog/digital converter 112, for signals which are passed from the filter device 109 to the regulation device 115.

Conversely, it is necessary for signals which are passed from the regulation device 115 to the filter device 109 to be converted from the digital domain to the analog domain in a digital/analog converter 113.

The matched current signal 205 is supplied via an input connection of the filter device 109 to an input filter unit 110, which is used as an anti-aliasing filter, with the output signal from the input filter unit 110 being supplied to the analog/digital converter 111. The digitized output signal from the analog/digital converter 111 is supplied to a digital filter unit 114 and to a determination unit 116.

Since charging signals are at a fixed frequency which can be predetermined, for example 16 kHz or 12 kHz, and, furthermore, are sinusoidal, the transfer function of the digital filter unit 114 consists of a single complex number, which is multiplied in a multiplication unit 121 by an output signal from a control unit 120.

The transfer function of the at least one data transmission path is determined in the determination unit 116 for the at least one frequency at which the charging signals are to be transmitted from a switching center to a subscriber point.

The output signal from the determination unit 116 is supplied to a nominal value comparison unit 118, in which a nominal value 117 may be entered, so that a control signal 119 can be produced as the output signal from the nominal value comparison unit 118, corresponding to a difference that is to be regulated out between the nominal value 117, which can be predetermined, and the actual signal determined by the determination unit 116. The control signal 119 is supplied to the control unit 120, so that, after multiplication by the output signal from the digital filter unit 114, an output signal is produced from the regulation device 115. The digital output signal from the regulation device 115 is supplied to the digital/analog converter 113 of the filter device 109, in order to obtain an analog signal which is proportional to the digital output signal from the regulation device 115, and which is supplied to an output filter unit 112 of the filter device 109.

Filtering in the output filter unit 112 of the filter device 109 is used to filter out oversampled components which are outside a transmission band of a transmission frequency range. The filtered signal is emitted from the filter device 109 as a driver input voltage level 107, which can be tapped off between an output connection of the filter device 109 and the ground connection 133, and is supplied to the driver device 201 (FIG. 1) or to the modified driver device (FIG. 2).

Since this driver input voltage level 107 is no longer based on an estimate, as in the case of methods for transmitting charging signals, but on an analysis of a network which comprises the data transmission path unit 122, the matching filter unit 123 and the modified driver device 202, it is possible to eliminate any influence of parallel currents in the matching filter unit 123 and in the at least one data transmission path unit 122, so that it is possible to obtain a constant line voltage level 101, which can be predetermined, across the line impedance 102.

Although the present invention has been described above on the basis of preferred exemplary embodiments, it is not restricted to these exemplary embodiments, but can be modified in a wide range of ways.

What is claimed is:

1. A method for transmitting charging signals at a transmission frequency on a data transmission path, the method comprising:
   determining an output current produced by a driver device;
   determining a transfer function of the data transmission path at the transmission frequency;
   providing a nominal value;
   modifying the output current to match the nominal value with an output signal corresponding to a predetermined line voltage level;

causing the driver device to provide a driver output voltage level that defines the line voltage level; and providing an amplifier circuit in the driver device, the amplifier circuit having a frequency-dependent gain factor for maintaining a constant predetermined line voltage level at the transmission frequency.

2. The method of claim 1, further comprising selecting the charging signals to be sinusoidal signals.

3. The method of claim 1, further comprising selecting the transmission frequency from the group consisting of 16 kHz and 12 kHz.

4. The method of claim 1, wherein causing the driver device to provide a driver output voltage level comprises causing the driver output voltage level to be independent of a line impedance of the data transmission path.

5. The method of claim 1, wherein providing an amplifier circuit comprises providing an amplifier with a feedback loop that includes a feedback resistive element and a feedback reactive element.

6. The method of claim 1, wherein causing the driver device to provide a driver output voltage level comprises producing a predetermined overall voltage drop.

7. The method of claim 1, further comprising producing a predetermined filter parallel current.

8. The method of claim 1, further comprising producing a predetermined filter series current.

9. An apparatus for transmitting charging signals on a data transmission path having a line impedance, the apparatus comprising:

a driver device for setting a line voltage level that corresponds to the line impedance, the driver device configured to provide, in response to a driver input voltage level, a driver output current and a driver output voltage level;

a current detection unit that provides a current signal indicative of the driver output current;

a current signal matching unit for receiving the current signal from the current detection unit and adjusting a level of the current signal for further processing by a filter device and by a regulation device; and a matching filter unit for matching the driver device to a data transmission path unit.

10. The apparatus of claim 9, wherein the driver device comprises an amplifier unit.

11. The apparatus of claim 10, wherein the amplifier unit comprises a feedback branch having a feedback resistance element and a feedback reactive element.

12. The apparatus of claim 11, wherein the feedback resistance element and the feedback reactive element comprise passive elements.

13. The apparatus of claim 11, wherein the feedback resistance element and the feedback reactive element comprise active elements.

14. The apparatus of claim 9, wherein the current detection unit comprises a Hall sensor.

15. The apparatus of claim 9, wherein the current detection unit comprises a shunt resistance element having a tap for a voltage drop that is proportional to the driver output current.

16. The apparatus of claim 9, wherein the current signal matching unit comprises a voltage divider.

* * * * *